United States Patent Office 3,057,866
Patented Oct. 9, 1962

3,057,866
PROCESS FOR THE PRODUCTION OF A SALT OF THE LAEVULINIC ACID DERIVATIVE OF CYANACETIC ACID HYDRAZIDE
Hans Albert Offe and Manfred Federmann, Wuppertal-Elberfeld, Germany, assignors to Farbenfabriken Bayer Aktiengesellschaft, Leverkusen, Germany, a corporation of Germany
No Drawing. Filed Oct. 26, 1960, Ser. No. 65,004
Claims priority, application Germany Oct. 28, 1959
6 Claims. (Cl. 260—268)

The laevulinic acid derivative of cyanacetic acid hydrazide is known (Gaz. chim. it. 83 of 1953, page 459–475). This hydrazone is, like the cyanacetic acid hydrazide, able to cure lung-worm infection of cattle and sheep. Like cyanacetic acid hydrazide, however, it possesses the disadvantage of not being soluble in water to the desired extent. Salts of this hydrazone are not known from literature.

It has now been found that well water-soluble salts of the aforesaid hydrazone can be obtained by reacting either the laevulinic acid derivative of cyanacetic acid hydrazide with piperazine, piperazine hydrate or piperazine-yielding agents in solution, or by reacting the piperazine salt of laevulinic acid with cyanacetic acid hydrazide. A salt is thus obtained of the general formula.

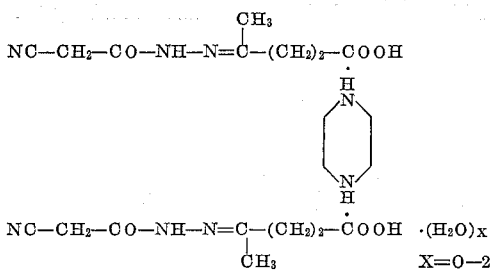

$$NC-CH_2-CO-NH-N=C-(CH_2)_2-COOH \cdot (H_2O)x$$
$$\qquad\qquad\qquad\qquad\qquad\ \ |$$
$$\qquad\qquad\qquad\qquad\qquad\ CH_3 \qquad\qquad X=0-2$$

It is obvious that the hydrazone of cyanacetic acid hydrazide and laevulinic acid can be brought into concentrated aqueous solution by means of agents such as caustic soda, sodium carbonate or bicarbonate, calcium carbonate, ammonia or simple aliphatic amines. In attempting to convert salts thus produced in a uniformly crystallized form, there are however, mostly obtained hygroscopic or viscid products or, as in the case of the calcium salt, a crystallized product which, with a water solubility of only 15% does not meet veterinary requirements.

On the other hand the piperazine salt of the laevulinic acid derivative of cyanacetic acid hydrazide can easily be obtained in a crystallized form. The salt is not hygroscopic, but posses a high water solubility which permits the production of 35% solutions at room temperature.

Moreover the piperazine salt of the aforesaid hydrazone is more effective than the cyanacetic acid hydrazide, as is apparent from the following table.

Cattle infected with lung worms were divided according to their degree of sickness, into four groups (group number in column 1; description of the degree of sickness in column 2 of the table). Of each group, a number of animals were treated with the piperazine salt of laevulinic acid derivative of cyanacetic acid hydrazone and after 14 days the percentage of the animals not excreting any lung worm larvae was determined (column 3 of the table). Apart from the examination of the general state of the animals, freedom from larvae in their excreta is an objective measure for the success of the treatment.

From each group a further number of animals were then treated three times with cyanacetic acid hydrazide for comparison. The percentage of the parasitologically cured animals, i.e. those which did not excrete larvae any more in their excreta after 14 days, are given in column 4.

|  |  | Percentage of the parasitologically cured animals ||
|---|---|---|---|
| Column 1 | Column 2 Division of the animals according to the degree of clinical illness | Column 3 Treated twice with 60 mg./kg. of the piperazine salt of the laevulinic acid derivative of cyanacetic acid Hydrazide | Column 4 Treated 3 times with 20 mg./kg. of the cyanacetic acid hydrazide |
| Group No.: |  |  |  |
| (1) | Larvae excreted without clinical illness. | 87 | 78 |
| (2) | Slightly ill | 80 | 46 |
| (3) | Average illness | 90 | 31 |
| (4) | Very ill | 70 | 12 |

For an exact evaluation of the therapeutic result groups No. 3 and 4 play the principal part (those excreting larvae without clinical symptoms and the slightly ill animals are only conditionally evaluatable, since good feeding and stabling in most cases achieves self-curing).

Twice treatment with the compound produced according to the invention thus leads in 90 or 70% of cases to curing whereas triple treatment with the comparison substance only leads in 31 or 12% of cases to curing.

The following examples are given for the purpose of illustrating the invention.

Example 1

98.5 g. of the laevulinic acid derivative of cyanacetic acid hydrazide suspended in 250 cc. of alcohol are treated with 48.5 g. of piperazine hexahydrate and heated to 40° C. until dissolved. The anhydrous salt (111 g.) filtered off with suction after cooling melts at 130–132° C. with decomposition. It is obtained very pure and can be isolated free from water of crystallisation or in the form of its dihydrate.

| $C_{20}H_{32}O_6N_8$ | Percent C | Percent H | Percent N |
|---|---|---|---|
| Calc | 50.0 | 6.7 | 23.3 |
| Found | 50.1 | 6.7 | 23.5 |

Example 2

19.7 g. of the laevulinic acid derivative of cyanacetic acid hydrazide suspended in 70 cc. of hot alcohol, are treated with 4.3 g. of piperazine-monohydrate. The resulting clear solution is filtered and separates after cooling 21.3 g. of the anhydrous salt of melting point 129–131° C. with decomposition.

Example 3

11.6 g. of laevulinic acid dissolved in 50 cc. of hot alcohol, are treated with 4.3 g. of piperazine and then with 9.9 g. of cyanacetic hydrazide. To the clear solution there are added 50 cc. of benzene. After 3 hours 23.7 g. of the salt are filtered off with suction as the dihydrate, which decomposes at 118–120° C.

| $C_{20}H_{36}O_5N_8$ | Percent C | Percent H | Percent N |
|---|---|---|---|
| Calc. | 46.4 | 7.0 | 21.6 |
| Found | 46.6 | 7.0 | 21.3 |

The alcohol may be replaced by the corresponding amount of methanol.

Example 4

To a solution of 36.5 g. of piperazine monoacetate in 350 cc. of methanol there is added a suspension of 98.5 g. of the laevulinic acid derivative of cyanacetic acid hydrazide in 300 cc. of methanol. The mixture is heated to 60° C. for some minutes. After cooling 78 g. of the pure salt are obtained.

We claim:
1. Process for the production of a salt of the laevulinic acid derivative of cyanacetic acid hydrazide, which comprises reacting a member selected from the group consisting of (1) the laevulinic acid derivative of cyanacetic acid hydrazide and (2) the piperazine salt of laevulinic acid with a member selected from the numbered group consisting of, respectively, (1) piperazine, piperazine hexahydrate, piperazine monohydrate and piperazine salts; and (2) cyanacetic hydrazide; and provided that the reactant members are selected from correspondingly numbered groups.

2. A compound of the formula $$NC-CH_2-CO-NH-N=\underset{\underset{CH_3}{|}}{C}-(CH_2)_2-COOH$$

$$NC-CH_2CO-NH-N=\underset{\underset{CH_3}{|}}{C}-(CH_2)_2-COOH \cdot (H_2O)_x$$

wherein X is a number from 0 to 2 inclusive.

3. Process that comprises reacting the laevulinic acid derivative of cyanacetic acid hydrazide with piperazine hexahydrate to form the corresponding piperazine salt of said laevulinic acid derivative of cyanacetic acid hydrazide.

4. Process that comprises reacting the laevulinic acid derivative of cyanacetic acid hydrazide with piperazine monohydrate to form the corresponding piperazine salt of said laevulinic acid derivative of cyanacetic acid hydrazide.

5. Process that comprises reacting the piperazine salt of laevulinic acid with cyanacetic acid hydrazide to form the corresponding piperazine salt of the laevulinic acid derivative of cyanacetic acid hydrazide.

6. Process that comprises reacting piperazine monoacetate with the laevulinic acid derivative of cyanacetic acid hydrazide to form the corresponding piperazine salt of said laevulinic acid derivative of cyanacetic acid hydrazide.

References Cited in the file of this patent

UNITED STATES PATENTS

| 2,708,195 | Abramson et al. | May 10, 1955 |
| 2,834,782 | Schlesinger et al. | May 13, 1958 |